(12) United States Patent
Lavoie et al.

(10) Patent No.: US 10,684,627 B2
(45) Date of Patent: Jun. 16, 2020

(54) ACCELEROMETER-BASED EXTERNAL SOUND MONITORING FOR POSITION AWARE AUTONOMOUS PARKING

(71) Applicant: Ford Global Technologies, LLC, Dearborn, MI (US)

(72) Inventors: Erick Michael Lavoie, Dearborn, MI (US); Joshua Wheeler, Trenton, MI (US); Scott Andrew Amman, Milford, MI (US); John Edward Huber, Novi, MI (US); Leah Busch, Berkley, MI (US); Ranjani Rangarajan, Farmington Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 159 days.

(21) Appl. No.: 15/889,887

(22) Filed: Feb. 6, 2018

(65) Prior Publication Data

US 2019/0243380 A1 Aug. 8, 2019

(51) Int. Cl.
*G05D 1/02* (2020.01)
*B60R 25/24* (2013.01)
*B60W 30/06* (2006.01)

(52) U.S. Cl.
CPC ........... *G05D 1/0276* (2013.01); *B60R 25/24* (2013.01); *B60W 30/06* (2013.01); *G05D 1/0214* (2013.01);
(Continued)

(58) Field of Classification Search
CPC ..... G06F 3/167; G06F 3/0488; G05D 1/0088; G05D 1/0276; G05D 1/0214;
(Continued)

(56) References Cited

U.S. PATENT DOCUMENTS 5,959,724 A 9/1999 Izumi
6,275,754 B1 8/2001 Shimizu
(Continued)

FOREIGN PATENT DOCUMENTS

CN 101929921 A 12/2010
CN 103818204 A 5/2014
(Continued)

OTHER PUBLICATIONS

Al-Sherbaz, Ali et al., Hybridisation of GNSS with other wireless/sensors technologies on board smartphones to offer seamless outdoors-indoors positioning for LBS applications, Apr. 2016, 3 pages.
(Continued)

*Primary Examiner* — Anne Marie Antonucci
*Assistant Examiner* — Sahar Motazedi
(74) *Attorney, Agent, or Firm* — Frank Lollo; Eversheds Sutherland (US) LLP (57) ABSTRACT

Method and apparatus are disclosed for accelerometer-based external sound monitoring for position aware autonomous parking. An example vehicle includes accelerometers mounted on windows of the vehicle, a computing platform communicatively coupled to the accelerometers, and an autonomy unit. The computing platform receives, via the accelerometers, signals indicative of a stop command associated with a voice. Additionally, the computing platform validates the stop command when the voice either is authorized or originates from within an emergency zone. The autonomy unit prevents autonomous motion of the vehicle in response to receiving the validated stop command.

15 Claims, 4 Drawing Sheets

(52) U.S. Cl.
CPC ....... *G05D 1/0255* (2013.01); *B60W 2554/00* (2020.02); *B60W 2720/10* (2013.01); *G05D 2201/0213* (2013.01)

(58) Field of Classification Search
CPC ........ G05D 1/0255; G05D 2201/0213; B60W 30/06; B60W 2550/20; B60R 25/257
See application file for complete search history.

(56) References Cited

U.S. PATENT DOCUMENTS

| | | | |
|---|---|---|---|
| 6,356,828 B1 | 3/2002 | Shimizu | |
| 6,452,617 B1 | 9/2002 | Bates | |
| 6,476,730 B2 | 11/2002 | Kakinami | |
| 6,477,260 B1 | 11/2002 | Shimomura | |
| 6,657,555 B2 | 12/2003 | Shimizu | |
| 6,683,539 B2 | 1/2004 | Trajkovic | |
| 6,724,322 B2 | 4/2004 | Tang | |
| 6,744,364 B2 | 6/2004 | Wathen | |
| 6,768,420 B2 | 7/2004 | McCarthy | |
| 6,801,855 B1 | 10/2004 | Walters | |
| 6,850,844 B1 | 1/2005 | Walters | |
| 6,850,148 B2 | 2/2005 | Masudaya | |
| 6,927,685 B2 | 8/2005 | Wathen | |
| 6,997,048 B2 | 2/2006 | Komatsu | |
| 7,042,332 B2 | 5/2006 | Takamura | |
| 7,123,167 B2 | 10/2006 | Staniszewski | |
| 7,307,655 B1 | 12/2007 | Okamoto | |
| 7,663,508 B2 | 2/2010 | Teshima | |
| 7,737,866 B2 | 6/2010 | Wu | |
| 7,813,844 B2 | 10/2010 | Gensler | |
| 7,825,828 B2 | 11/2010 | Watanabe | |
| 7,834,778 B2 | 11/2010 | Browne | |
| 7,847,709 B2 | 12/2010 | McCall | |
| 7,850,078 B2 | 12/2010 | Christenson | |
| 7,924,483 B2 | 4/2011 | Smith | |
| 8,035,503 B2 | 10/2011 | Partin | |
| 8,054,169 B2 | 11/2011 | Bettecken | |
| 8,098,146 B2 | 1/2012 | Petrucelli | |
| 8,126,450 B2 | 2/2012 | Howarter | |
| 8,164,628 B2 | 4/2012 | Stein | |
| 8,180,524 B2 | 5/2012 | Eguchi | |
| 8,180,547 B2 | 5/2012 | Prasad | |
| 8,224,313 B2 | 7/2012 | Howarter | |
| 8,229,645 B2 | 7/2012 | Lee | |
| 8,242,884 B2 | 8/2012 | Holcomb | |
| 8,319,605 B2 * | 11/2012 | Hassan | G01C 17/38 340/10.2 |
| 8,335,598 B2 | 12/2012 | Dickerhoof | |
| 8,401,235 B2 | 3/2013 | Lee | |
| 8,493,236 B2 | 7/2013 | Boehme | |
| 8,538,408 B2 | 9/2013 | Howarter | |
| 8,542,130 B2 | 9/2013 | Lavoie | |
| 8,552,856 B2 | 10/2013 | McRae | |
| 8,587,681 B2 | 11/2013 | Guidash | |
| 8,594,616 B2 | 11/2013 | Gusikhin | |
| 8,599,043 B2 | 12/2013 | Kadowaki | |
| 8,618,945 B2 | 12/2013 | Furuta | |
| 8,645,015 B2 | 2/2014 | Oetiker | |
| 8,655,551 B2 | 2/2014 | Danz | |
| 8,692,773 B2 | 4/2014 | You | |
| 8,706,350 B2 | 4/2014 | Talty | |
| 8,725,315 B2 | 5/2014 | Talty | |
| 8,742,947 B2 | 6/2014 | Nakazono | |
| 8,744,684 B2 | 6/2014 | Hong | |
| 8,780,257 B2 | 7/2014 | Gidon | |
| 8,787,868 B2 | 7/2014 | Leblanc | |
| 8,825,262 B2 | 9/2014 | Lee | |
| 8,933,778 B2 | 1/2015 | Birkel | |
| 8,957,786 B2 | 2/2015 | Stempnik | |
| 8,994,548 B2 | 3/2015 | Gaboury | |
| 8,995,914 B2 | 3/2015 | Nishidai | |
| 9,008,860 B2 | 4/2015 | Waldock | |
| 9,014,920 B1 | 4/2015 | Torres | |
| 9,078,200 B2 | 7/2015 | Wuergler | |
| 9,086,879 B2 | 7/2015 | Gautama | |
| 9,141,503 B1 | 9/2015 | Chen | |
| 9,147,065 B2 | 9/2015 | Lauer | |
| 9,154,920 B2 | 10/2015 | O'Brien | |
| 9,168,955 B2 | 10/2015 | Noh | |
| 9,193,387 B2 | 11/2015 | Auer | |
| 9,194,168 B1 * | 11/2015 | Lu | E05F 15/70 |
| 9,225,531 B2 | 12/2015 | Hachey | |
| 9,230,439 B2 | 1/2016 | Boulay | |
| 9,233,710 B2 | 1/2016 | Lavoie | |
| 9,273,966 B2 | 3/2016 | Bartels | |
| 9,275,208 B2 | 3/2016 | Protopapas | |
| 9,283,960 B1 | 3/2016 | Lavoie | |
| 9,286,803 B2 | 3/2016 | Tippelhofer | |
| 9,302,675 B2 | 4/2016 | Schilling | |
| 9,318,022 B2 | 4/2016 | Barth | |
| 9,379,567 B2 | 6/2016 | Kracker | |
| 9,381,859 B2 | 7/2016 | Nagata | |
| 9,429,657 B2 | 8/2016 | Sidhu | |
| 9,429,947 B1 | 8/2016 | Wengreen et al. | |
| 9,454,251 B1 | 9/2016 | Guihot | |
| 9,469,247 B2 | 10/2016 | Juneja | |
| 9,493,187 B2 | 11/2016 | Pilutti | |
| 9,506,774 B2 | 11/2016 | Shutko | |
| 9,511,799 B2 | 12/2016 | Lavoie | |
| 9,522,675 B1 | 12/2016 | You | |
| 9,529,519 B2 | 12/2016 | Blumenberg | |
| 9,557,741 B1 | 1/2017 | Elie | |
| 9,563,990 B2 | 2/2017 | Khan | |
| 9,595,145 B2 | 3/2017 | Avery | |
| 9,598,051 B2 | 3/2017 | Okada | |
| 9,606,241 B2 | 3/2017 | Varoglu | |
| 9,616,923 B2 | 4/2017 | Lavoie | |
| 9,637,117 B1 | 5/2017 | Gusikhin | |
| 9,651,655 B2 | 5/2017 | Feldman | |
| 9,656,690 B2 | 5/2017 | Shen | |
| 9,666,040 B2 | 5/2017 | Flaherty | |
| 9,688,306 B2 | 6/2017 | McClain | |
| 9,701,280 B2 | 7/2017 | Schussmann | |
| 9,712,977 B2 | 7/2017 | Tu | |
| 9,715,816 B1 | 7/2017 | Adler | |
| 9,725,069 B2 | 8/2017 | Krishnan | |
| 9,731,714 B2 | 8/2017 | Kiriya | |
| 9,731,764 B2 | 8/2017 | Baek | |
| 9,754,173 B2 | 9/2017 | Kim | |
| 9,809,218 B2 | 11/2017 | Elie | |
| 9,811,085 B1 | 11/2017 | Hayes | |
| 9,842,444 B2 | 12/2017 | Van Wiemeersch | |
| 9,845,070 B2 | 12/2017 | Petel | |
| 9,846,431 B2 | 12/2017 | Petel | |
| 9,914,333 B2 | 3/2018 | Shank | |
| 9,921,743 B2 | 3/2018 | Bryant | |
| 9,946,255 B2 | 4/2018 | Matters | |
| 9,959,763 B2 | 5/2018 | Miller | |
| 9,971,130 B1 | 5/2018 | Lin | |
| 9,975,504 B2 | 5/2018 | Dalke | |
| 10,019,001 B2 | 7/2018 | Dang Van Nhan | |
| 10,032,276 B1 | 7/2018 | Liu | |
| 10,040,482 B1 | 8/2018 | Jung | |
| 10,043,076 B1 | 8/2018 | Zhang | |
| 10,131,347 B2 | 11/2018 | Kim | |
| 10,192,113 B1 | 1/2019 | Liu | |
| 10,246,055 B2 | 4/2019 | Farges | |
| 10,268,341 B2 | 4/2019 | Kocienda | |
| 2002/0107649 A1 * | 8/2002 | Takiguchi | A61B 5/1038 702/75 |
| 2003/0060972 A1 | 3/2003 | Kakinami | |
| 2003/0098792 A1 | 5/2003 | Edwards | |
| 2003/0133027 A1 | 7/2003 | Itoh | |
| 2003/0206102 A1 * | 11/2003 | Joao | B60R 25/102 340/539.1 |
| 2005/0030156 A1 | 2/2005 | Alfonso | |
| 2005/0068450 A1 | 3/2005 | Steinberg | |
| 2005/0099275 A1 | 5/2005 | Kamdar | |
| 2006/0010961 A1 | 1/2006 | Gibson | |
| 2006/0227010 A1 | 10/2006 | Berstis | |
| 2006/0235590 A1 | 10/2006 | Bolourchi | |
| 2007/0230944 A1 | 10/2007 | Georgiev | |
| 2008/0027591 A1 | 1/2008 | Lenser | |

(56) References Cited

U.S. PATENT DOCUMENTS

| | | | |
|---|---|---|---|
| 2008/0154464 A1 | 6/2008 | Sasajima | |
| 2008/0154613 A1* | 6/2008 | Haulick | B60R 25/257 |
| | | | 704/275 |
| 2008/0238643 A1 | 10/2008 | Malen | |
| 2008/0306683 A1 | 12/2008 | Ando | |
| 2009/0096753 A1 | 4/2009 | Lim | |
| 2009/0098907 A1 | 4/2009 | Huntzicker | |
| 2009/0115639 A1 | 5/2009 | Proefke | |
| 2009/0125181 A1 | 5/2009 | Luke | |
| 2009/0125311 A1 | 5/2009 | Haulick et al. | |
| 2009/0128315 A1 | 5/2009 | Griesser | |
| 2009/0146813 A1 | 6/2009 | Nuno | |
| 2009/0174574 A1 | 7/2009 | Endo | |
| 2009/0241031 A1 | 9/2009 | Gamaley | |
| 2009/0289813 A1 | 11/2009 | Kwiecinski | |
| 2009/0309970 A1 | 12/2009 | Ishii | |
| 2009/0313095 A1 | 12/2009 | Hurpin | |
| 2010/0025942 A1 | 2/2010 | Mangaroo | |
| 2010/0061564 A1 | 3/2010 | Clemow | |
| 2010/0114471 A1 | 5/2010 | Sugiyama | |
| 2010/0114488 A1 | 5/2010 | Khamharn | |
| 2010/0136944 A1 | 6/2010 | Taylor | |
| 2010/0152972 A1 | 6/2010 | Attard | |
| 2010/0156672 A1 | 6/2010 | Yoo | |
| 2010/0245277 A1 | 9/2010 | Nakao | |
| 2010/0259420 A1 | 10/2010 | Von Rehyer | |
| 2011/0071725 A1 | 3/2011 | Kleve | |
| 2011/0082613 A1 | 4/2011 | Oetiker | |
| 2011/0190972 A1 | 8/2011 | Timmons | |
| 2011/0205088 A1 | 8/2011 | Baker | |
| 2011/0253463 A1 | 10/2011 | Smith | |
| 2011/0309922 A1 | 12/2011 | Ghabra | |
| 2012/0007741 A1 | 1/2012 | Laffey | |
| 2012/0072067 A1 | 3/2012 | Jecker | |
| 2012/0083960 A1 | 4/2012 | Zhu | |
| 2012/0173080 A1 | 7/2012 | Cluff | |
| 2012/0176332 A1 | 7/2012 | Fujibayashi | |
| 2012/0271500 A1 | 10/2012 | Tsimhoni | |
| 2012/0303258 A1* | 11/2012 | Pampus | B60W 30/0956 |
| | | | 701/301 |
| 2012/0323643 A1 | 12/2012 | Volz | |
| 2012/0323700 A1 | 12/2012 | Aleksandrovich | |
| 2013/0021171 A1 | 1/2013 | Hsu | |
| 2013/0024202 A1 | 1/2013 | Harris | |
| 2013/0043989 A1 | 2/2013 | Niemz | |
| 2013/0073119 A1 | 3/2013 | Huger | |
| 2013/0109342 A1 | 5/2013 | Welch | |
| 2013/0110342 A1 | 5/2013 | Wuttke | |
| 2013/0113936 A1 | 5/2013 | Cohen | |
| 2013/0124061 A1 | 5/2013 | Khanafer | |
| 2013/0145441 A1 | 6/2013 | Mujumdar | |
| 2013/0211623 A1 | 8/2013 | Thompson | |
| 2013/0231824 A1 | 9/2013 | Wilson | |
| 2013/0289825 A1 | 10/2013 | Noh | |
| 2013/0314502 A1 | 11/2013 | Urbach | |
| 2013/0317944 A1 | 11/2013 | Huang | |
| 2014/0052323 A1 | 2/2014 | Reichel | |
| 2014/0095994 A1 | 4/2014 | Kim | |
| 2014/0096051 A1 | 4/2014 | Boblett | |
| 2014/0121930 A1 | 5/2014 | Allexi | |
| 2014/0147032 A1 | 5/2014 | Yous | |
| 2014/0156107 A1 | 6/2014 | Karasawa | |
| 2014/0188339 A1 | 7/2014 | Moon | |
| 2014/0222252 A1 | 8/2014 | Matters | |
| 2014/0240502 A1 | 8/2014 | Strauss | |
| 2014/0282931 A1 | 9/2014 | Protopapas | |
| 2014/0297120 A1 | 10/2014 | Cotgrove | |
| 2014/0300504 A1 | 10/2014 | Shaffer | |
| 2014/0303839 A1 | 10/2014 | Filev | |
| 2014/0320318 A1 | 10/2014 | Victor | |
| 2014/0327736 A1 | 11/2014 | DeJohn | |
| 2014/0350804 A1 | 11/2014 | Park | |
| 2014/0350855 A1 | 11/2014 | Vishnuvajhala | |
| 2014/0365108 A1 | 12/2014 | You | |
| 2014/0365126 A1 | 12/2014 | Vulcano | |
| 2015/0022468 A1 | 1/2015 | Cha | |
| 2015/0039173 A1 | 2/2015 | Beaurepaire | |
| 2015/0039224 A1 | 2/2015 | Tuukkanen | |
| 2015/0048927 A1 | 2/2015 | Simmons | |
| 2015/0066545 A1 | 3/2015 | Kotecha | |
| 2015/0077522 A1 | 3/2015 | Suzuki | |
| 2015/0088360 A1 | 3/2015 | Bonnet | |
| 2015/0091741 A1 | 4/2015 | Stefik | |
| 2015/0109116 A1 | 4/2015 | Grimm | |
| 2015/0116079 A1 | 4/2015 | Mishra | |
| 2015/0123818 A1 | 5/2015 | Sellschopp | |
| 2015/0127208 A1 | 5/2015 | Jecker | |
| 2015/0149265 A1 | 5/2015 | Huntzicker | |
| 2015/0151789 A1 | 6/2015 | Lee | |
| 2015/0153178 A1 | 6/2015 | Koo | |
| 2015/0161890 A1 | 6/2015 | Huntzicker | |
| 2015/0163649 A1 | 6/2015 | Chen | |
| 2015/0197278 A1 | 7/2015 | Boos | |
| 2015/0203111 A1 | 7/2015 | Bonnet | |
| 2015/0203156 A1 | 7/2015 | Hafner | |
| 2015/0210317 A1 | 7/2015 | Hafner | |
| 2015/0217693 A1 | 8/2015 | Pliefke | |
| 2015/0219464 A1 | 8/2015 | Beaurepaire | |
| 2015/0220791 A1 | 8/2015 | Wu | |
| 2015/0226146 A1 | 8/2015 | Elwart | |
| 2015/0274016 A1 | 10/2015 | Kinoshita | |
| 2015/0286340 A1 | 10/2015 | Send | |
| 2015/0329110 A1 | 11/2015 | Stefan | |
| 2015/0344028 A1 | 12/2015 | Gieseke | |
| 2015/0346727 A1 | 12/2015 | Ramanujam | |
| 2015/0356872 A1* | 12/2015 | Atsmon | G08G 1/0112 |
| | | | 701/522 |
| 2015/0360720 A1 | 12/2015 | Li | |
| 2015/0365401 A1 | 12/2015 | Brown | |
| 2015/0371541 A1 | 12/2015 | Korman | |
| 2015/0375741 A1 | 12/2015 | Kiriya | |
| 2015/0375742 A1 | 12/2015 | Gebert | |
| 2016/0012653 A1 | 1/2016 | Soroka | |
| 2016/0012726 A1 | 1/2016 | Wang | |
| 2016/0018821 A1 | 1/2016 | Akita | |
| 2016/0055749 A1 | 2/2016 | Nicoll | |
| 2016/0153778 A1 | 2/2016 | Singh | |
| 2016/0062354 A1 | 3/2016 | Li | |
| 2016/0068158 A1 | 3/2016 | Elwart | |
| 2016/0068187 A1 | 3/2016 | Hata | |
| 2016/0075369 A1 | 3/2016 | Lavoie | |
| 2016/0090055 A1 | 3/2016 | Breed | |
| 2016/0107689 A1 | 4/2016 | Lee | |
| 2016/0112846 A1 | 4/2016 | Siswick | |
| 2016/0114726 A1 | 4/2016 | Nagata | |
| 2016/0117926 A1 | 4/2016 | Akavaram | |
| 2016/0127664 A1 | 5/2016 | Bruder | |
| 2016/0139244 A1 | 5/2016 | Holtman | |
| 2016/0144857 A1 | 5/2016 | Ohshima | |
| 2016/0152263 A1 | 6/2016 | Singh | |
| 2016/0170494 A1* | 6/2016 | Bonnet | G06F 3/017 |
| | | | 345/173 |
| 2016/0185389 A1 | 6/2016 | Ishijima | |
| 2016/0189435 A1 | 6/2016 | Beaurepaire | |
| 2016/0207528 A1 | 7/2016 | Stefan | |
| 2016/0224025 A1 | 8/2016 | Petel | |
| 2016/0229452 A1 | 8/2016 | Lavoie | |
| 2016/0236680 A1 | 8/2016 | Lavoie | |
| 2016/0249294 A1 | 8/2016 | Lee | |
| 2016/0257304 A1 | 9/2016 | Lavoie | |
| 2016/0272244 A1 | 9/2016 | Imai | |
| 2016/0282442 A1 | 9/2016 | O'Mahony | |
| 2016/0284217 A1 | 9/2016 | Lee | |
| 2016/0288657 A1 | 10/2016 | Tokura | |
| 2016/0300417 A1 | 10/2016 | Hatton | |
| 2016/0304087 A1 | 10/2016 | Noh | |
| 2016/0304088 A1 | 10/2016 | Barth | |
| 2016/0349362 A1 | 10/2016 | Rohr | |
| 2016/0321445 A1 | 11/2016 | Turgeman | |
| 2016/0321926 A1 | 11/2016 | Mayer | |
| 2016/0334797 A1 | 11/2016 | Ross | |
| 2016/0343235 A1* | 11/2016 | Belvin | G08B 21/24 |
| 2016/0347280 A1 | 12/2016 | Daman | |
| 2016/0355125 A1 | 12/2016 | Herbert | |

(56) References Cited

U.S. PATENT DOCUMENTS

| | | |
|---|---|---|
| 2016/0357354 A1 | 12/2016 | Chen |
| 2016/0358474 A1 | 12/2016 | Uppal |
| 2016/0368489 A1* | 12/2016 | Aich .................. B60W 30/06 |
| 2016/0371607 A1 | 12/2016 | Rosen |
| 2016/0371691 A1 | 12/2016 | Kang |
| 2017/0001650 A1 | 1/2017 | Park |
| 2017/0008563 A1 | 1/2017 | Popken |
| 2017/0026198 A1 | 1/2017 | Ochiai |
| 2017/0028985 A1 | 2/2017 | Kiyokawa |
| 2017/0030722 A1 | 2/2017 | Kojo |
| 2017/0032593 A1 | 2/2017 | Patel |
| 2017/0072947 A1 | 3/2017 | Lavoie |
| 2017/0073004 A1 | 3/2017 | Shepard |
| 2017/0076603 A1 | 3/2017 | Bostick |
| 2017/0097504 A1 | 4/2017 | Takamatsu |
| 2017/0116790 A1 | 4/2017 | Kusens |
| 2017/0123423 A1 | 5/2017 | Sako |
| 2017/0129537 A1 | 5/2017 | Kim |
| 2017/0129538 A1 | 5/2017 | Stefan |
| 2017/0132482 A1 | 5/2017 | Kim |
| 2017/0144654 A1 | 5/2017 | Sham |
| 2017/0144656 A1 | 5/2017 | Kim |
| 2017/0147995 A1 | 5/2017 | Kalimi |
| 2017/0168479 A1 | 6/2017 | Dang |
| 2017/0192428 A1 | 7/2017 | Vogt |
| 2017/0193825 A1* | 7/2017 | Schlechter ............. G08G 1/005 |
| 2017/0200369 A1 | 7/2017 | Miller |
| 2017/0203763 A1 | 7/2017 | Yamada |
| 2017/0208438 A1 | 7/2017 | Dickow |
| 2017/0297385 A1 | 10/2017 | Kim |
| 2017/0297620 A1 | 10/2017 | Lavoie |
| 2017/0301241 A1 | 10/2017 | Urhahne |
| 2017/0308075 A1 | 10/2017 | Whitaker |
| 2017/0336788 A1 | 11/2017 | Iagnemma |
| 2017/0357317 A1 | 12/2017 | Chaudhri |
| 2017/0371514 A1 | 12/2017 | Cullin |
| 2018/0015878 A1 | 1/2018 | McNew |
| 2018/0024559 A1 | 1/2018 | Seo |
| 2018/0029591 A1 | 2/2018 | Lavoie |
| 2018/0029608 A1 | 2/2018 | Solar |
| 2018/0039264 A1 | 2/2018 | Messner |
| 2018/0043884 A1 | 2/2018 | Johnson |
| 2018/0056939 A1 | 3/2018 | van Roermund |
| 2018/0056989 A1 | 3/2018 | Donald |
| 2018/0082588 A1 | 3/2018 | Hoffman, Jr. |
| 2018/0088330 A1 | 3/2018 | Giannuzzi |
| 2018/0093663 A1 | 4/2018 | Kim |
| 2018/0105165 A1 | 4/2018 | Alarcon |
| 2018/0105167 A1 | 4/2018 | Kim |
| 2018/0148094 A1 | 5/2018 | Mukaiyama |
| 2018/0174460 A1 | 6/2018 | Jung |
| 2018/0189971 A1 | 7/2018 | Hildreth |
| 2018/0194344 A1 | 7/2018 | Wang |
| 2018/0196963 A1 | 7/2018 | Bandiwdekar |
| 2018/0224863 A1 | 8/2018 | Fu |
| 2018/0236957 A1* | 8/2018 | Nam .................... B62D 15/027 |
| 2018/0284802 A1 | 10/2018 | Tsai |
| 2018/0286072 A1 | 10/2018 | Tsai |
| 2018/0339654 A1 | 11/2018 | Kim |
| 2018/0345851 A1 | 12/2018 | Lavoie |
| 2018/0364731 A1 | 12/2018 | Liu |
| 2018/0367731 A1* | 12/2018 | Gatti .................. H04N 5/23238 |
| 2019/0005445 A1 | 1/2019 | Bahrainwala |
| 2019/0042003 A1 | 2/2019 | Parazynski |
| 2019/0066503 A1 | 2/2019 | Li |
| 2019/0103027 A1 | 4/2019 | Wheeler |
| 2019/0137990 A1 | 5/2019 | Golgiri |

FOREIGN PATENT DOCUMENTS

| | | |
|---|---|---|
| CN | 104183153 A | 12/2014 |
| CN | 104485013 A | 4/2015 |
| CN | 104691544 A | 6/2015 |
| CN | 103049159 B | 7/2015 |
| CN | 105513412 A | 4/2016 |
| CN | 105588563 A | 5/2016 |
| CN | 105599703 A | 5/2016 |
| CN | 105774691 A | 7/2016 |
| CN | 106027749 A | 10/2016 |
| CN | 205719000 U | 11/2016 |
| CN | 106598630 A | 4/2017 |
| CN | 106782572 A | 5/2017 |
| CN | 106945662 A | 7/2017 |
| CN | 104290751 B | 1/2018 |
| DE | 3844340 A1 | 7/1990 |
| DE | 19817142 A1 | 10/1999 |
| DE | 19821163 A1 | 11/1999 |
| DE | 102005006966 A1 | 9/2005 |
| DE | 102006058213 A1 | 7/2008 |
| DE | 102009024083 A1 | 7/2010 |
| DE | 102016224529 A1 | 3/2011 |
| DE | 102016226008 A1 | 3/2011 |
| DE | 102012008858 A1 | 11/2012 |
| DE | 102009060169 A1 | 6/2013 |
| DE | 102011080148 A1 | 7/2013 |
| DE | 102012200725 A1 | 9/2013 |
| DE | 102010034129 B2 | 10/2013 |
| DE | 102011122421 A1 | 6/2014 |
| DE | 102012222972 A1 | 6/2014 |
| DE | 102013016342 A1 | 1/2015 |
| DE | 102014009077 A1 | 2/2015 |
| DE | 102012215218 A1 | 4/2015 |
| DE | 102012222972 A1 | 5/2015 |
| DE | 102013019904 A1 | 5/2015 |
| DE | 102014007915 A1 | 12/2015 |
| DE | 102014007915 A1 | 2/2016 |
| DE | 102014011802 A1 | 2/2016 |
| DE | 102014111570 A1 | 2/2016 |
| DE | 102014015655 A1 | 4/2016 |
| DE | 102014226458 A1 | 6/2016 |
| DE | 102015209976 A1 | 12/2016 |
| DE | 102014015655 A1 | 5/2017 |
| DE | 102016011916 A1 | 6/2017 |
| DE | 102016125282 A1 | 7/2017 |
| DE | 102015221224 A1 | 12/2017 |
| DE | 102016011916 A1 | 2/2018 |
| DE | 102016125282 A1 | 6/2018 |
| DE | 102016211021 A1 | 6/2018 |
| EP | 2653367 A1 | 6/2000 |
| EP | 2768718 B1 | 6/2011 |
| EP | 2289768 A2 | 10/2013 |
| EP | 2620351 B1 | 12/2015 |
| EP | 2295281 A1 | 3/2016 |
| EP | 2135788 B1 | 6/2016 |
| EP | 2135788 B1 | 6/2017 |
| FR | 3021798 A1 | 12/2012 |
| GB | 2534471 A | 10/2000 |
| GB | 2344481 A | 12/2012 |
| GB | 2497836 A | 9/2014 |
| GB | 2481324 A | 3/2015 |
| GB | 2517835 A | 5/2016 |
| GB | 2491720 A | 7/2016 |
| JP | 2004142543 A | 5/2004 |
| JP | 2004287884 A | 10/2004 |
| JP | 2005193742 A | 7/2005 |
| JP | 2004142543 A | 4/2009 |
| JP | 2016119032 A | 4/2009 |
| JP | 2004287884 A | 7/2014 |
| JP | 2014134082 A | 7/2014 |
| JP | 2016119032 A | 6/2016 |
| JP | 2014134082 A | 7/2016 |
| JP | 2014125196 A | 4/2018 |
| KR | 20130106005 A | 6/2006 |
| KR | 20160039460 A | 5/2008 |
| KR | 20100006714 A | 1/2010 |
| KR | 20160051993 A | 1/2010 |
| KR | 20130106005 A | 9/2013 |
| KR | 20160039460 A | 4/2016 |
| KR | 20100006714 A | 5/2016 |
| WO | WO 2017/112444 A1 | 12/2010 |
| WO | WO 2017/118510 A1 | 6/2011 |
| WO | WO 2006/064544 A1 | 11/2011 |
| WO | WO 2017/125514 A1 | 1/2013 |
| WO | WO 2008/055567 A1 | 4/2013 |

(56) References Cited

FOREIGN PATENT DOCUMENTS

| WO | WO 2010/006981 A1 | 8/2013 |
|---|---|---|
| WO | WO 2011/141096 A1 | 7/2014 |
| WO | WO 2015/068032 A1 | 5/2015 |
| WO | WO 2015/193058 A1 | 12/2015 |
| WO | WO 2016/046269 A1 | 3/2016 |
| WO | WO 2015/068032 A1 | 8/2016 |
| WO | WO 2015/193058 A1 | 9/2016 |
| WO | WO 2017/062448 A1 | 4/2017 |
| WO | WO 2016/128200 A1 | 5/2017 |
| WO | WO 2016/134822 A1 | 6/2017 |
| WO | WO 2017/062448 A1 | 6/2017 |
| WO | WO 2017/073159 A1 | 6/2017 |
| WO | WO 2017/096307 A1 | 6/2017 |
| WO | WO 2017/097942 A1 | 7/2017 |
| WO | WO 2017/118510 A1 | 7/2017 |

OTHER PUBLICATIONS

Jingbin Liu, IParking: An Intelligent Indoor Location-Based Smartphone Parking Service, Oct. 31, 2012, 15 pages.
Alberto Broggi and Elena Cardarelli, Vehicle Detection for Autonomous Parking Using a Soft-Cascade ADA Boost Classifier, Jun. 8, 2014.
Automatically Into the Parking Space—https://www.mercedes-benz.com/en/mercedes-benz/next/automation/automatically-into-the-parking-space/; Oct. 27, 2014.
Bill Howard, Bosch's View of the Future Car: Truly Keyless Entry, Haptic Feedback, Smart Parking, Cybersecurity, Jan. 9, 2017, 8 Pages.
ChargeItSpot Locations, Find a Phone Charging Station Near You, retrieved at https://chargeitspot.com/locations/ on Nov. 28, 2017.
Core System Requirements Specification (SyRS), Jun. 30, 2011, Research and Innovative Technology Administration.
Daimler Ag, Remote Parking Pilot, Mar. 2016 (3 Pages).
Land Rover, Land Rover Remote Control via Iphone RC Range Rover Sport Showcase—Autogefühl, Retrieved from https://www.youtube.com/watch?v=4ZaaYNaEFio (at 43 seconds and 1 minute 42 seconds), Sep. 16, 2015.
Perpendicular Parking—https://prezi.com/toqmfyxriksl/perpendicular-parking/.
SafeCharge, Secure Cell Phone Charging Stations & Lockers, retrieved at https://www.thesafecharge.com on Nov. 28, 2017.
Search Report dated Jan. 19, 2018 for GB Patent Application No. 1711988.4 (3 pages).
Search Report dated Jul. 11, 2017 for GB Patent Application No. 1700447.4 (3 Pages).
Search Report dated May 21, 2018 for Great Britain Patent Application No. GB 1800277.4 (5 Pages).
Search Report dated Nov. 22, 2018 for GB Patent Application No. GB 1809829.3 (6 pages).
Search Report dated Nov. 27, 2018 for GB Patent Application No. GB 1809112.4 (3 pages).
Search Report dated Nov. 28, 2017, for GB Patent Application No. GB 1710916.6 (4 Pages).
Search Report dated Nov. 28, 2018 for GB Patent Application No. GB 1809842.6 (5 pages).
Search Report dated Oct. 10, 2018 for GB Patent Application No. 1806499.8 (4 pages).
Tesla Model S Owner's Manual v2018.44. Oct. 29, 2018.
Vehicle's Orientation Measurement Method by Single-Camera Image Using Known-Shaped Planar Object, Nozomu Araki, Takao Sato, Yasuo Konishi and Hiroyuki Ishigaki, 2010.
Land Rover develops a smartphone remote control for its SUVs, James Vincent, Jun. 18, 2015.

\* cited by examiner

ACCELEROMETER-BASED EXTERNAL SOUND MONITORING FOR POSITION AWARE AUTONOMOUS PARKING

TECHNICAL FIELD

The present disclosure generally relates to remote parking assist systems and, more specifically, accelerometer-based external sound monitoring for position aware autonomous parking.

BACKGROUND

A semi-autonomous vehicle is a vehicle that is normally operated by a driver, but certain specialized functions are autonomous. For example, some vehicles have adaptive cruise control or autopilot that facilitates, in certain circumstances, the vehicle controlling its speed and following distance independent of driver controlling input. Increasingly, vehicles are equipped with parking assist functions that park and unpark the vehicle. However, in some scenarios, vehicles need to be parked into and removed from narrow parking spaces (or the parking space becomes narrow after the vehicle is parked) in which there is not enough room to open a door of the vehicle. In such scenarios, the driver cannot exit the vehicle after it parks or enter the vehicle to leave the parking space.

SUMMARY

The appended claims define this application. The present disclosure summarizes aspects of the embodiments and should not be used to limit the claims. Other implementations are contemplated in accordance with the techniques described herein, as will be apparent to one having ordinary skill in the art upon examination of the following drawings and detailed description, and these implementations are intended to be within the scope of this application.

Example embodiments are disclosed for accelerometer-based external sound monitoring for position aware autonomous parking. An example vehicle includes accelerometers mounted on windows of the vehicle, a computing platform communicatively coupled to the accelerometers, and an autonomy unit. The computing platform receives, via the accelerometers, signals indicative of a stop command associated with a voice. Additionally, the computing platform validates the stop command when the voice either is authorized or originates from within an emergency zone. The autonomy unit prevents autonomous motion of the vehicle in response to receiving the validated stop command.

An example method to control a vehicle includes receiving, via accelerometers mounted on windows of the vehicle, signals associated with a voice. The example method also includes determining when the signals are indicative of a stop command. Additionally, the example method includes validating the stop command when the voice either is either authorized or originates from within an emergency zone, and in response to receiving the validated stop command, preventing autonomous motion of the vehicle.

BRIEF DESCRIPTION OF THE DRAWINGS

For a better understanding of the invention, reference may be made to embodiments shown in the following drawings. The components in the drawings are not necessarily to scale and related elements may be omitted, or in some instances proportions may have been exaggerated, so as to emphasize and clearly illustrate the novel features described herein. In addition, system components can be variously arranged, as known in the art. Further, in the drawings, like reference numerals designate corresponding parts throughout the several views.

DETAILED DESCRIPTION OF EXAMPLE EMBODIMENTS

While the invention may be embodied in various forms, there are shown in the drawings, and will hereinafter be described, some exemplary and non-limiting embodiments, with the understanding that the present disclosure is to be considered an exemplification of the invention and is not intended to limit the invention to the specific embodiments illustrated.

Remote park assist (RePA) systems autonomously park a vehicle when a driver is outside the vehicle. Currently, normal parking spaces are 7.5 to 9.0 feet wide. However, as space in urban areas becomes more valuable and vehicles with remote parking assist become more common, parking spaces will become narrower. For example, a parking space may be designed to have a three inch clearance on each side of the vehicle. In such conditions, occupants of the vehicle must exit the vehicle before it parks.

As disclosed below, in conjunction with a key fob, a driver uses voice commands to control the parking and unparking of the vehicle. However, traditional electric condenser microphones (ECMs) are not constructed for external use. Their delicate microphone diaphragms can be rendered unusable by dirt, snow, rain, or mud. Instead, because sound causes oscillation as it travels through a medium, accelerometers are placed on one or more of the edge of vehicle glass surfaces. This oscillation is measured as a vibration by the accelerometer when the pressure wave impinges on a window of the vehicle. The resulting electrical output from the accelerometer is processed by an analyzed by a speech recognition system. The accelerometers are installed on one or more of the windows (e.g., the windshield, the back glass, the left front door glass, the left backseat door glass, the right front door glass, the right backseat door glass, the moon roof, etc.) of the vehicle.

To use the remote parking assist, a driver stops the vehicle in the vicinity of a parking spot in a location where the occupant(s) of the vehicle can exit the vehicle. The driver activates the remote parking assist using physical or soft controls provided by the infotainment head unit and/or the infotainment system. The vehicle detects the parking spot using range detection sensors (e.g., ultrasonic sensors, radar, lidar, cameras, etc.) and calculates a path from the vehicle's current position into the parking spot. The path may include one or more maneuvers that adjust the angle and/or speed of the vehicle. A driver holds key fob or mobile device (e.g., smart phone, smart watch, etc.) associated with the vehicle. While pressing a button on the key fob or mobile device, the driver gives vocal commands to start the assisted parking operations. In some examples, the button is a dedicated button on the key fob that is used only for activating the assisted parking system. The vehicle detects, via the accelerometers on the window, the voice commands and a signal from the key fob or mobile device generated by the button press. The vehicle also determines the distance between the key fob or mobile device and the vehicle (e.g., based on the received signal strength indicator (RSSI) of the signal).

When (i) the voice command matches a key word or phrase (e.g., "Start" or "Park"), (ii) the button on the key fob or mobile device is pressed, and (iii) the key fob or mobile device is within a threshold distance (e.g., 6 meters (19.67 feet)) of the vehicle and (iv) the voice is authorized, the vehicle (a) acknowledges receipt of the command (e.g., via an audible or visual alert) and (b) starts the assisted parking feature to park in the parking spot. In some examples, the key word or phrase is preceded by a wake-up-word. The wake-up-word can be any word selected by the manufacturer or the driver, such an uncommon word (e.g., "Sync," etc.) or a name (e.g., "Clara," etc.). The vehicle continues to autonomously park until (a) the vehicle completes the parking maneuvers, (b) the button on the key fob or mobile device is not pressed, (c) the key fob or mobile device is outside the threshold distance, or (d) the vehicle receives a vocal command to stop (e.g., a key word of phrase such as "Stop"). When a stop command is received, the vehicle determines whether the voice that issued the stop command is authorized. When the voice is authorized, the vehicle stops its motion. When the voice is not authorized, the vehicle determines whether the voice originates from a direction corresponding to the motion of the vehicle (e.g., the voice originate from a location that is in the path of the vehicle). When the unauthorized voice originates from a direction corresponding to the motion of the vehicle, the vehicle stops its motion. Otherwise, the when the unauthorized voice does not originate from a direction corresponding to the motion of the vehicle, the vehicle ignores the command. In some examples, the vehicle determines a distance of the unauthorized voice from the vehicle to determine whether the source of the command is within in the path of the vehicle.

Figure 1:
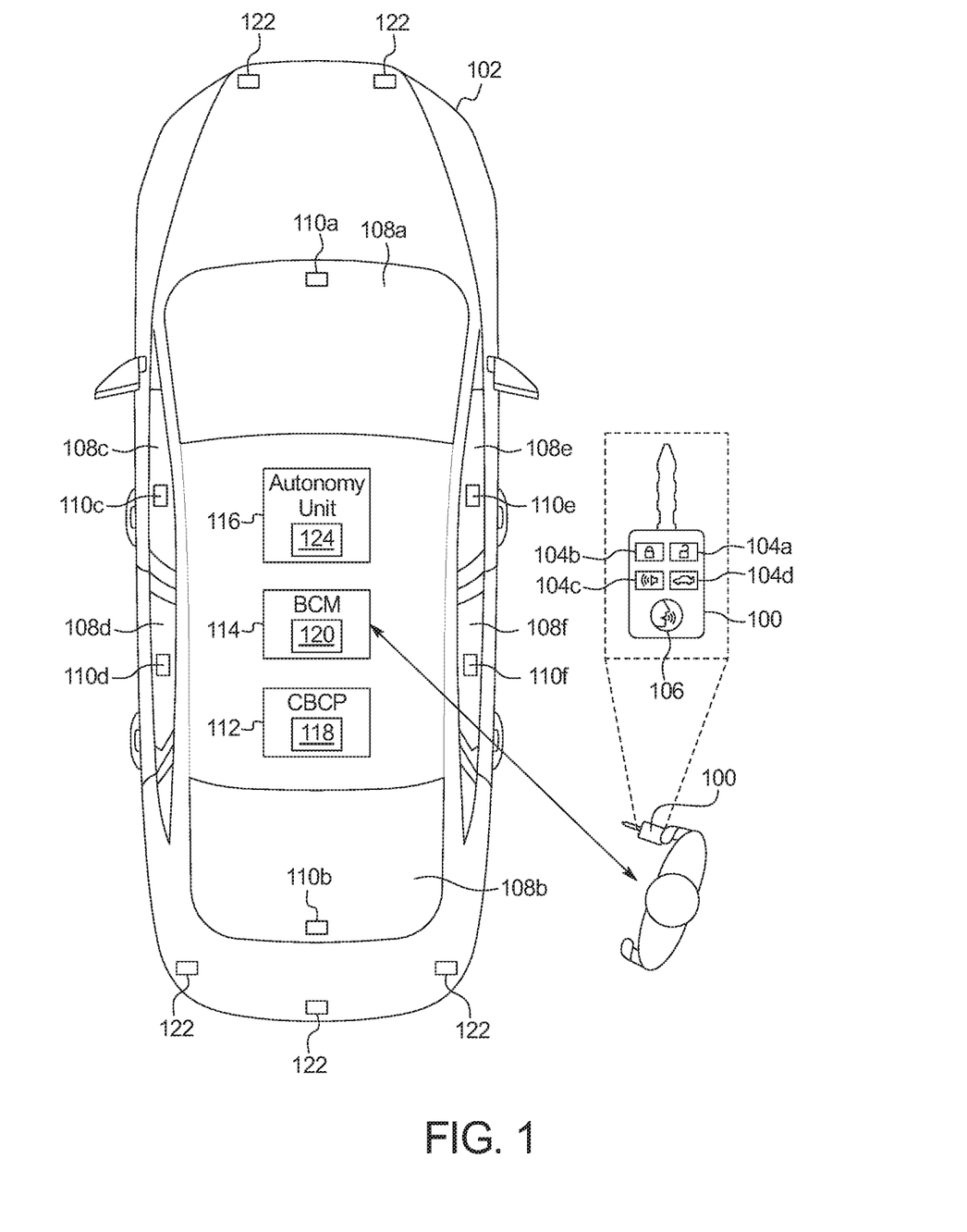
FIG. 1 illustrates a system with a key fob and a vehicle operating in accordance to the teachings of this disclosure.

FIG. 1 illustrates a system with a key fob 100 and a vehicle 102 operating in accordance to the teachings of this disclosure. The key fob 100 is configured to remotely instruct the vehicle 102 to perform operations, such as locking and unlocking its doors and/or unlatching the trunk, etc. The illustrated example depicts a key fob; however, the vehicle 102 may be communicatively coupled to any suitable mobile device (e.g., a smart phone, a smart watch, etc.) that includes an application to cause the mobile device to act like a key fob. The key fob 100 includes a radio transmitter and an antenna. The radio transmitter is configured to have a range of approximately 6.0 meters to 15.0 meters (20 feet to 50 feet). Additionally, the radio transmitter is tuned to a particular operating frequency. For example, the operating frequency may be 315 MHz (for North America) or 433.92 MHz (for Europe). Alternatively or additionally, in some examples, the key fob 100 includes a short-range wireless module with hardware and firmware to establish a connection with the vehicle 102. In some examples, the short-range wireless module implements the Bluetooth and/or Bluetooth Low Energy (BLE) protocols. The Bluetooth and BLE protocols are set forth in Volume 6 of the Bluetooth Specification 4.0 (and subsequent revisions) maintained by the Bluetooth Special Interest Group.

In the illustrated example, the key fob 100 includes hard (e.g., physical) or soft (e.g., virtual) buttons 104a-104d that correspond to various functions that the key fob 100 is capable of requesting from the vehicle 102. For example, the key fob 100 may include a door unlock button 104a, a door lock button 104b, an alarm button 104c, and/or a trunk open button 104d. Additionally, the key fob 100 includes a remote parking assist (RePA) button 106. Pressing the buttons 104a-104d and 106 causes the key fob 100 to send, via a radio transmitter and an antenna, messages to the vehicle 102 that include specific commands to communicate the desired action to the vehicle 102. For example, pressing the door unlock button 104a once causes the key fob 100 to send a message to unlock the front driver's side door and pressing the door unlock button 104a twice in rapid succession causes the key fob 100 to send a different command to unlock all the doors of the vehicle 102. The RePA button 106 is a button dedicated to enabling the remote parking assist function of the vehicle 102. While pressed, the RePA button 106 causes the key fob 100 to periodically send a message (sometimes referred to as a "heartbeat message") to the vehicle 102 indicating that the RePA button 106 is pressed. For example, while pressed, the RePA button 106 may cause the key fob 100 to broadcast the message every 500 milliseconds.

The vehicle 102 may be a standard gasoline powered vehicle, a hybrid vehicle, an electric vehicle, a fuel cell vehicle, and/or any other mobility implement type of vehicle. The vehicle 102 includes parts related to mobility, such as a power train with an engine, a transmission, a suspension, a driveshaft, and/or wheels, etc. The vehicle 102 may be semi-autonomous (e.g., some routine motive functions controlled by the vehicle 102) or autonomous (e.g., motive functions are controlled by the vehicle 102 without direct driver input). In the illustrated example the vehicle 102 includes windows 108a-108f, accelerometers 110a-110f, an on-board computing platform (OBCM) 112, a body control module (BCM) 114, and an autonomy unit 116.

The windows include a windshield 108a, a back glass 108b, a left front door glass 108c, a left backseat door glass 108d, a right front door glass 108e, a right backseat door glass 108f, and/or a moon roof (not shown). Some of the windows 108a-108f are made of laminated glass (sometimes referred to as "safety glass") (e.g., the windshield 108a, etc.) and some of the windows 108a-108f are made of non-laminated tempered glass (e.g., the left front door glass 108c, the left backseat door glass 108d, the right front door glass 108e, the right backseat door glass 108f, etc.). The glass of the windows 108a-108f vibrates when struck by sound waves.

The accelerometers 110a-110f may be any type of accelerometer that (a) measures the vibrations perpendicular to the plane of glass of the corresponding window 108a-108f and (b) measures a wide frequency range (e.g., the frequency range of audible sound, etc.), including uniaxial or triaxial accelerometers, micromachined or piezoelectric accelerometers, etc. Each one of the accelerometers 110a-110f is rigidly mounted on a corresponding one of the windows 108a-108f on the interior of the cabin of the vehicle 102. In some example, the accelerometers 110a-110f are mounted on the windows 108a-108f in a manner as to no obstruct the view of the driver. For example, the accelerometer 110a on the windshield 108a may be attached to the glass of the windshield 108a proximate to where the rear-view mirror is mounted. As another example, the accelerometer 110b on the back glass 108b may be attached to the glass of the back glass 108b proximate to the rear defroster connector on the glass or where the rear brake light is mounted. The accelerometers 110a-110f are wired or wirelessly communicatively coupled to the on-board computing platform 112. The accelerometers 110a-110f send signals of the vibrations of the windows 108a-108f to the on-board computing platform 112. Alternatively, in some examples, the vehicle 102 includes externally mounted traditional microphones to receive voice commands.

The on-board computing platform 112 includes processor(s) and/or controller(s) (e.g., digital signal processors, microcontrollers, integrated circuits, field programmable gate arrays (FPGAs), application-specific integrated circuits (ASICs), etc.) and memory (e.g., volatile and non-volatile memory) to perform signal processing on the signals of the vibrations received from the accelerometers 110a-110f. In some examples, the on-board computing platform 112 is incorporated into another electronic control unit (ECU), such as the body control module 114, the autonomy unit 116, or an infotainment head unit. The on-board computing platform 112 includes a speech recognizer 118 that performs speech recognition on the signals received from the accelerometers 110a-110f when the remote parking assist system has been enabled (e.g., via the infotainment head unit, etc.).

The speech recognizer 118 (a) distinguishes between authorized and unauthorized voices and (b) performs speech recognition to determine whether the signals received from the accelerometers 110a-110f are indicative of a voice command. To distinguish between authorized and unauthorized voices, the speech recognizer 118 performs voice recognition on the signals received from the accelerometers 110a-110f. The speech recognizer 118 accesses voice prints stored in the memory to compare voice characteristics of the speaker to voice characteristics of authorized users. In some examples, the voice prints are generated through a setup process (e.g., protected by a credential challenge, etc.) in which the authorized user provides voice samples with which the speech recognizer 118 processes to generate the voice prints. In some examples, as discussed below, the speech recognizer 118 learns whether a voice is authorized over time. When signals indicative of a voice are received, the speech recognizer 118 uses techniques, such as frequency estimation, hidden Markov models, Gaussian mixture models, pattern matching algorithms, neural networks, and/or decision trees, to determine whether the received voice matches one of the stored voice prints.

Alternatively or additionally, in some examples, the speech recognizer 118 distinguishes between authorized and unauthorized voices by localizing the source of the voice and localizing the key fob 100. To localize the source of the voice, the speech recognizer 118 compares the intensity of the voice (e.g., in decibels (dB)) received from the different accelerometers 110a-110f to estimate which direction relative the windows 108a-108f that the voice originated from and estimate a distance from the vehicle 102 that the voice originated from. In some such examples, using the intensity of the voice, the speech recognizer 118 performs trilateration to estimate the location relative the vehicle 102 from which the voice originated. In such example, the speech recognizer 118 receives, from the body control module 114, a estimated location of the key fob 100 relative the vehicle 102. When the estimated location of the voice and the estimated location of the key fob 100 are within a threshold distance of each other (e.g., 0.25 meters, 0.5 meters, etc.), the speech recognizer 118 associates the voice with the key fob and assumes that the voice is authorized. In some such examples, the speech recognizer 118 generates a voice print of the speaker holding the key fob 100 over time so that voice recognition can be performed using voice recognition techniques. Example methods of developing biometric authentication over time are described in U.S. application Ser. No. 15/688,624, entitled "Biometric Authentication for a Vehicle Without Prior Registration," filed Aug. 28, 2017, which is herein incorporated by reference in its entirety.

The speech recognizer 118 receives the signals from the accelerometer 110a-110f and performs speech recognition on the signals when the remote parking assist system has been enabled. The speech recognizer 118 determines whether the voice command represented by the signal from the accelerometers 110a-110f matches a wake-up-word followed by a key word or phrase. In some examples, the speech recognizer 118 listens for certain key words or phrases without the wake-up-word. For examples, when the key word or phrase is associated with a command to halt the motion of the vehicle (e.g., a "stop" command), the speech recognizer 118 processes the command described below. In some examples, the key word or phrase vocabulary that the speech recognizer 118 understands is small. For example, the key word or phrase vocabulary may only include "park" and "stop." In other examples, the key word or phrase vocabulary may also include rudimentary directions, such as "turn left" and "turn right." In some examples, the key word or phrase vocabulary includes words (e.g., "power down," etc.) that will cause the body control module 114 to secure the vehicle 102 (e.g., turn off the engine, lock the doors, etc.) after the autonomy unit 116 autonomously parks the vehicle 102.

Figure 2:
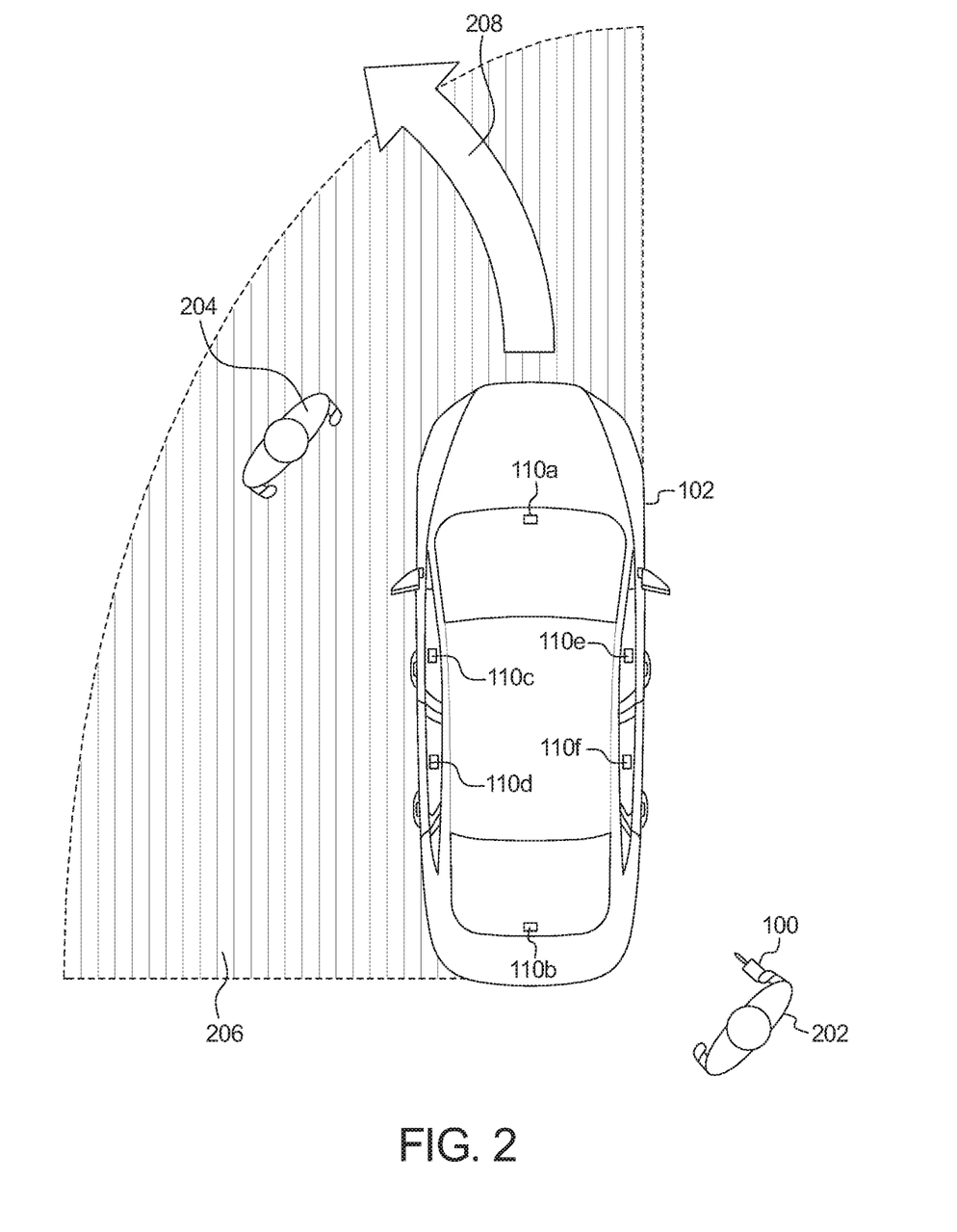
FIG. 2 illustrates the vehicle of FIG. 1 performing an autonomous parking maneuver.

When a command is received, the speech recognizer 118 determines whether the voice that issued the command is authorized. When the voice that issued the command is authorized, the speech recognizer 118 recognizes the command as valid and provides the command to the autonomy unit 116. When the voice is not authorized, but the received command is a command to halt motion of the vehicle 102 (e.g., a "stop" command), the speech recognizer 118 determines whether to recognize the command as valid based on the location relative to the vehicle 102 of the origin of the voice that issued the command. FIG. 2 illustrates the vehicle 102 performing a remote parking assist maneuver. The illustrated example depicts an operator 202 with the key fob 100 and a bystander 204. To determine whether to recognize the command as valid based on the location relative to the vehicle 102 of the origin of the voice, the speech recognizer 118 establishes a emergency zone 206. The emergency zone 206 is a bounded area in the vicinity of the vehicle 102 that defines where the bystanders 204 may be affected by the movement of the vehicle 102. The emergency zone 206 is based on a current path 208 or direction of travel of the vehicle 102 so that bystanders 204 in that path 208 can command the vehicle 102 to stop moving. For example, the emergency zone 206 may encompass are area that the vehicle 102 and a buffer around the vehicle 102 (e.g., three feet, etc.) are projected to enter within the next fifteen seconds. Additionally, in some examples, the boundaries of the emergency zone 206 are based on a speed of the vehicle 102. For example, the boundaries in the direction of travel of the vehicle 102 may increase in distance from the vehicle 102 the faster the vehicle 102 is traveling. Additionally, the speech recognizer 118 trilaterates (as discussed above) the source of the "stop" command (e.g., the bystander 204) to determine whether the source of the "stop" command is within the emergency zone 206. When the source of the "stop" command is within the emergency zone 206, the speech recognizer 118 recognizes the command as valid and provides the command to the autonomy unit 116. Otherwise, the speech recognizer 118 ignores the command.

Returning to FIG. 1, the body control module 114 controls various subsystems of the vehicle 102. For example, the body control module 114 may control power windows, power locks, an immobilizer system, and/or power mirrors, etc. The body control module 114 includes circuits to, for example, drive relays (e.g., to control wiper fluid, etc.), drive brushed direct current (DC) motors (e.g., to control power seats, power locks, power windows, wipers, etc.), drive stepper motors, and/or drive LEDs, etc. The body control module 114 controls the lights (e.g., the head lights, the tail lights, etc.) the horn of the vehicle 102. The body control module 114 includes a remote keyless entry module 120 that wirelessly receives messages from the key fob 100. When the key fob 100 is authorized and a message from the key fob 100 includes an instruction to operate a function of the vehicle 102 (e.g., unlock the doors, open the trunk, sound the alarm, etc.), the body control module 114 performs those functions. Additionally, the remote keyless entry module 120 estimates the distance the key fob 100 is from the vehicle 102 based on the received signal strength indicator (RSSI) of the signal between the key fob 100 and the remote keyless entry module 120. In some examples, in response to receiving instructions from the on-board computing platform 112, the body control module 114 locks the doors.

The autonomy unit 116 is in communication with the electronic control units (ECUs) that control the motive functions (e.g., steering, brake, and throttle, etc.) of the vehicle 102. In some examples, in response to receiving instructions from the on-board computing platform 112, the autonomy unit turns off the engine of the vehicle 102. The autonomy unit 116 includes hardware and firmware to facilitate navigating the vehicle 102 in various traffic scenarios autonomously without driver intervention using camera(s), range detection sensors 122 (e.g., automotive radar, LiDAR, ultrasonic sensors, etc.) and/or navigational data/vehicle position data (e.g., coordinates from global positioning system (GPS) receivers, horizon data, vehicle status data from an inertial measurement unit (IMU), etc.). For example, the autonomy unit 116 may include a remote parking assist system, a lane assist system, and/or an autopilot system, etc. In the illustrated example, the autonomy unit 116 includes a remote parking assist module 124.

The remote parking assist module 124, when enabled via the infotainment system, determines a location and orientation of a proximate parking space using the range detection sensors 122. Based on the location and orientation of a proximate parking space and the location and orientation of the vehicle 102, the remote parking assist module 124 determines a path (e.g., of which the path 208 of FIG. 2 is part of) that includes one or more maneuvers to get the vehicle 102 into the parking space. When the parking space is detected and a valid path is determined, the remote parking assist module 124 causes the back-lit button on the infotainment head unit to illuminate and/or a soft button to appear on the infotainment system.

After the back-lit button or the soft button is pressed, the remote parking assist module 124 waits to execute the path until the corresponding voice command is received from the on-board computing platform 112 and an indication that the RePA button 106 is pressed on the key fob 100 is received from the body control module 114. In some examples, the remote parking assist module 124 acknowledges receipt of a recognized voice command by signally using the head lights and/or tail lights, and/or briefly activating the horn of the vehicle 102. Additionally, the remote parking assist module 124 does not perform the maneuvers when the key fob 100 is not within a threshold distance (e.g., 6 meters (19.67 feet), etc.) of the vehicle 102. The remote parking assist module 124 continues to autonomously park until (a) the remote parking assist module 124 completes the parking maneuvers, (b) the remote keyless entry module 120 does not receive a message indicating that the RePA button 106 on the key fob 100 is pressed after a threshold period of time (e.g., 750 milliseconds, etc.), (c) the key fob 100 is outside the threshold distance, or (d) the remote parking assist module 124 receives a vocal command to stop via the on-board computing platform 112.

When the vehicle 102 is parked into the parking spot, the remote parking assist module 124 will back up upon receiving an instruction from the on-board computing platform 112 triggered by a voice command when the RePA button 106 on the key fob is pressed and the key fob 100 is within the threshold distance. In some example the vehicle backs up or returns to the original pre-park position until (a) the vehicle 102 has backed up a target distance (e.g., a car length, two car lengths) or is in the original pre-park position, (b) the remote keyless entry module 120 does not receive a message indicating that the RePA button 106 on the key fob 100 is pressed after a threshold period of time (e.g., 750 milliseconds, etc.), the key fob 100 is outside the threshold distance, or (d) the remote parking assist module 124 receives a vocal command to stop via the on-board computing platform 112.

Figure 3:
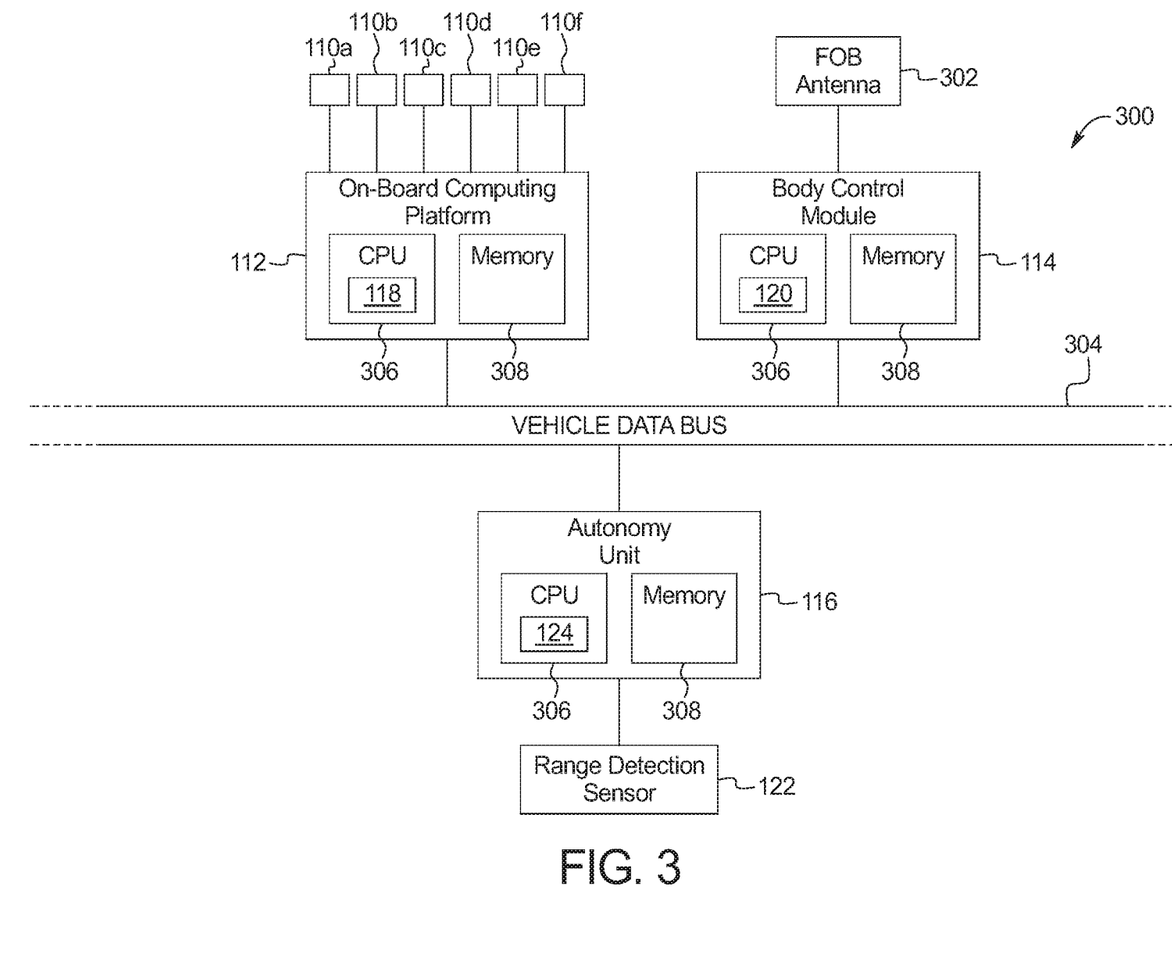
FIG. 3 is a block diagram of electronic components of the vehicle of FIGS. 1 and 2.

FIG. 3 is a block diagram of electronic components 300 of the vehicle 102 of FIGS. 1 and 2. In the illustrated example, the electronic components 300 include the accelerometers 110 $a$-110 $f$, the on-board computing platform 112, the body control module 114, the autonomy unit 116, the range detection sensors 122, a key fob antenna 302, and a vehicle data bus 304.

In the illustrated example, the on-board computing platform 112, the body control module 114, the autonomy unit 116 each include a processor or controller 306 and memory 308. The example on-board computing platform 112 is structured to include the speech recognizer 118. The example the body control module 114 is structured to include the remote keyless entry module 120. The example autonomy unit 116 is structured to include the remote parking assist module 124. The processors or controllers 306 may be any suitable processing device or set of processing devices such as, but not limited to: a microprocessor, a microcontroller-based platform, a suitable integrated circuit, a digital signal processor (DSP), one or more field programmable gate arrays (FPGAs), and/or one or more application-specific integrated circuits (ASICs). The memory 308 may be volatile memory (e.g., RAM, which can include non-volatile RAM, magnetic RAM, ferroelectric RAM, and any other suitable forms); non-volatile memory (e.g., disk memory, FLASH memory, EPROMs, EEPROMs, non-volatile solid-state memory, etc.), unalterable memory (e.g., EPROMs), read-only memory, and/or high-capacity storage devices (e.g., hard drives, solid state drives, etc). In some examples, the memory 308 includes multiple kinds of memory, particularly volatile memory and non-volatile memory.

The memory 308 is computer readable media on which one or more sets of instructions, such as the software for operating the methods of the present disclosure can be embedded. The instructions may embody one or more of the methods or logic as described herein. In a particular embodiment, the instructions may reside completely, or at least partially, within any one or more of the memory 308, the computer readable medium, and/or within the processor 306 during execution of the instructions.

The terms "non-transitory computer-readable medium" and "tangible computer-readable medium" should be understood to include a single medium or multiple media, such as a centralized or distributed database, and/or associated caches and servers that store one or more sets of instructions. The terms "non-transitory computer-readable medium" and "tangible computer-readable medium" also include any tangible medium that is capable of storing, encoding or carrying a set of instructions for execution by a processor or that cause a system to perform any one or more of the methods or operations disclosed herein. As used herein, the term "tangible computer readable medium" is expressly defined to include any type of computer readable storage device and/or storage disk and to exclude propagating signals.

The vehicle data bus 304 communicatively couples the on-board computing platform 112, the body control module 114, and the autonomy unit 116. In some examples, the vehicle data bus 304 includes one or more data buses. The vehicle data bus 304 may be implemented in accordance with a controller area network (CAN) bus protocol as defined by International Standards Organization (ISO) 11898-1, a Media Oriented Systems Transport (MOST) bus protocol, a CAN flexible data (CAN-FD) bus protocol (ISO 11898-7) and/a K-line bus protocol (ISO 9141 and ISO 14230-1), and/or an Ethernet™ bus protocol IEEE 802.3 (2002 onwards), etc.

Figure 4:
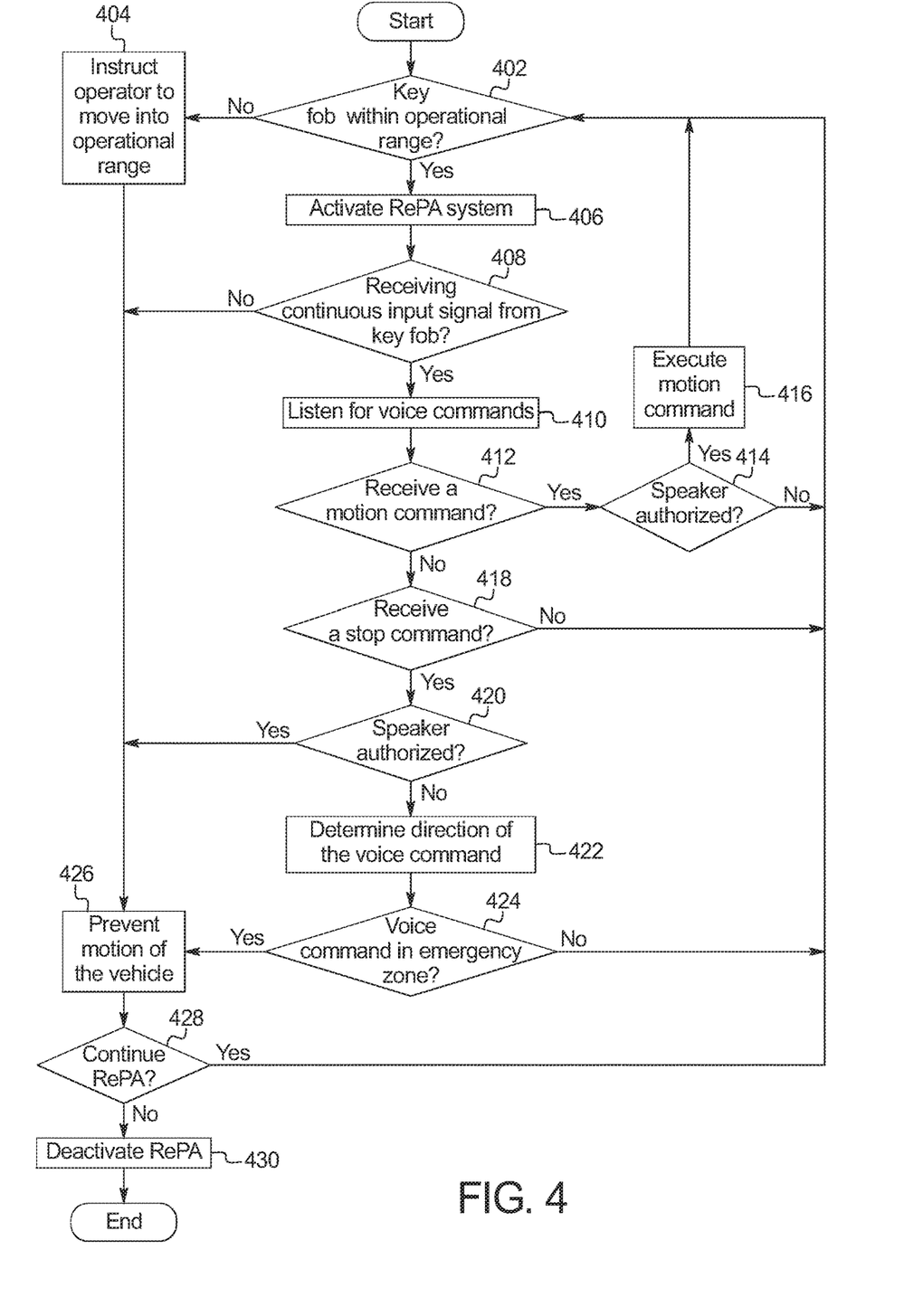
FIG. 4 is a flowchart of a method to distinguish between authorized and unauthorized voice commands, which may be implemented by the electronic components of FIG. 3.

FIG. 4 is a flowchart of a method to distinguish between authorized and unauthorized voice commands to control the vehicle 102 of FIGS. 1 and 2, which may be implemented by the electronic components 300 of FIG. 3. The example method begins when the RePA system is activated. Initially, at block 402, the remote keyless entry module 120 determines whether the key fob 100 is within the operational range of the vehicle 102. For example, the operational range may be a threshold distance selected to satisfy a regulation. As such an example, the operational range may be 6.0 meters (19.7 feet). When the key fob 100 is not within the operational range, the method continues at block 404. Otherwise, when the key fob 100 is within the operational range, the method continues to block 406. At block 404, the remote keyless entry module 120 communicates to the operator 202 to move into the operational range. In some examples, the remote keyless entry module 120 sends a message to the key fob 100 to provide an visual, audio, and/or haptic alert to the operator 202. In some examples, the remote keyless entry module 120 instructs to body control module 114 to illuminate lights of the vehicle 102 in a certain pattern.

At block 406, the remote parking assist module 124 activates the RePA system to receive commands from the operator 202. At block 408, the remote parking assist module 124 determines whether the key fob 100 is broadcasting the continuous input signal. When the key fob 100 is not broadcasting the continuous input signal, the method continues to block 426. Otherwise, when the key fob 100 is broadcasting the continuous input signal, the method continues at block 410. At block 410, the speech recognizer 118 listens for voice commands via the accelerometers 110a-110f.

At block 412, the speech recognizer 118 determines whether a command that that causes and/or changes the motion of the vehicle 102 (e.g., a "motion command") is received. For example, a command to commence autonomous parking or a command to adjust the position of the vehicle 102 may be received. When a motion command is received, the method continues at block 414. Otherwise, when a motion command is not received, the method continues to block 418. At block 414, the speech recognizer 118 determines whether the speaker is authorized. When the speaker is authorized, the method continues to block 416. Otherwise, when the speaker is not authorized, the speech recognizer ignores the command and the method returns to block 402. At block 416, the remote parking assist module 124 handles the received motion command.

At block 418, the speech recognizer 118 determines whether the a stop command is received. When a stop command is received, the method continues at block 420. Otherwise, when a stop command is not received, the method returns to block 402. At block 420, the speech recognizer 118 determines whether the speaker is authorized. When the speaker is not authorized, the method continues at block 422. Otherwise, when the speaker is authorized, the method continues at block 426. At block 422, the speech recognizer determines the location of the speaker of the voice command relative the vehicle 102. At block 424, the speech recognizer determines whether the voice command originated in the emergency zone 206. When the voice command originated in the emergency zone 206, the method continues to block 426. Otherwise, when the voice command originates outside of the emergency zone 206, the speech recognizer 118 ignores the command and the method returns to block 402. At block 426, the remote parking assist module 124 prevents autonomous motion of the vehicle 102.

At block 428, the remote parking assist module 124 determines whether to deactivate the RePA system. In some examples, the remote parking assist module 124 tracks a time that the vehicle 102 has not moved, and when that time reaches a threshold (e.g., one minute, two minutes, etc.). When the remote parking assist module 124 determines to deactivate the RePA system, the method continues to block 430. Otherwise, when the remote parking assist module 124 does not determine to deactivate the RePA system, the method returns to block 402. At block 430, the remote parking assist module 124 deactivates the RePA system and the method ends.

In this application, the use of the disjunctive is intended to include the conjunctive. The use of definite or indefinite articles is not intended to indicate cardinality. In particular, a reference to "the" object or "a" and "an" object is intended to denote also one of a possible plurality of such objects. Further, the conjunction "or" may be used to convey features that are simultaneously present instead of mutually exclusive alternatives. In other words, the conjunction "or" should be understood to include "and/or". As used here, the terms "module" and "unit" refer to hardware with circuitry to provide communication, control and/or monitoring capabilities, often in conjunction with sensors. "Modules" and "units" may also include firmware that executes on the circuitry. The terms "includes," "including," and "include" are inclusive and have the same scope as "comprises," "comprising," and "comprise" respectively.

The above-described embodiments, and particularly any "preferred" embodiments, are possible examples of implementations and merely set forth for a clear understanding of the principles of the invention. Many variations and modifications may be made to the above-described embodiment(s) without substantially departing from the spirit and principles of the techniques described herein. All modifications are intended to be included herein within the scope of this disclosure and protected by the following claims.

What is claimed is:
1. A vehicle comprising:
   accelerometers mounted on windows of the vehicle;
   a computing platform communicatively coupled to the accelerometers to:
      receive, via the accelerometers, signals indicative of vibrations of the windows caused by a voice;

determine a stop command associated with the voice based on the signals; and validate the stop command when the voice either is authorized or originates from within an emergency zone; and an autonomy unit to, in response to receiving the validated stop command, prevent autonomous motion of the vehicle.

2. The vehicle of claim 1, wherein the computing platform is to define boundaries of the emergency zone when the vehicle is in motion.

3. The vehicle of claim 2, wherein the boundaries of the emergency zone are based on a direction of travel of the vehicle.

4. The vehicle of claim 3, wherein the boundaries of the emergency zone are further based on a speed of the vehicle.

5. The vehicle of claim 1, wherein to determine whether the voice originates from within the emergency zone, the computing platform is to compare intensity of the voice from the accelerometers based on the signals;

estimate a direction relative the windows that the voice originated from based on comparing the intensity of the voice; and estimate a distance from the vehicle that the voice originated from based on the direction.

6. The vehicle of claim 1, wherein to determine that the voice is authorized, the computing platform is to perform voice recognition on the voice using voice prints stored in memory.

7. The vehicle of claim 1, including:

a body control module communicatively coupled to a mobile device, the body control module to determine a first location of the mobile device relative to the vehicle; and wherein the computing platform is to:

determine a second location of an origin of the voice; and determine that the voice is authorized when the first location is within a threshold distance of the second location.

8. The vehicle of claim 1, wherein the computing platform is to prevent autonomous movement of the vehicle and ignore voice commands when (a) a continuous input signal is not received from a key fob or (b) the key fob is not within a threshold distance of the vehicle.

9. A method to control a vehicle comprising:

receiving, via accelerometers mounted on windows of the vehicle, signals indicative of vibrations of the windows caused by a voice;

determining, via a processor of the vehicle, a stop command associated with the voice based on the signals;

validating the stop command when the voice either is authorized or originates from within an emergency zone; and in response to receiving the validated stop command, preventing autonomous motion of the vehicle.

10. The method of claim 9, including defining boundaries of the emergency zone when the vehicle is in motion.

11. The method of claim 10, wherein the boundaries of the emergency zone are based on a direction of travel of the vehicle.

12. The method of claim 11, wherein the boundaries of the emergency zone are further based on a speed of the vehicle.

13. The method of claim 9, wherein determining whether the voice originates from within the emergency zone includes:

comparing intensity of the voice from the accelerometers based on the signals;

estimating a direction relative the windows that the voice originated from based on comparing the intensity of the voice; and estimating a distance from the vehicle that the voice originated from based on the direction.

14. The method of claim 9, wherein determining that the voice is authorized includes performing voice recognition on the voice using voice prints stored in memory.

15. The method of claim 9, including:

determining, via a body control module, a first location of an authorized key fob relative to the vehicle;

determining a second location of an origin of the voice; and determining that the voice is authorized when the first location is within a threshold distance of the second location.

* * * * *